(12) United States Patent
Ellis

(10) Patent No.: US 9,604,439 B1
(45) Date of Patent: Mar. 28, 2017

(54) CARPET TILE COATING SYSTEM AND METHOD

(71) Applicant: Michael A. Ellis, Dalton, GA (US)

(72) Inventor: Michael A. Ellis, Dalton, GA (US)

( * ) Notice: Subject to any disclaimer, the term of this patent is extended or adjusted under 35 U.S.C. 154(b) by 350 days.

(21) Appl. No.: 14/572,669

(22) Filed: Dec. 16, 2014

Related U.S. Application Data

(60) Provisional application No. 61/917,141, filed on Dec. 17, 2013.

(51) Int. Cl.
| | |
|---|---|
| *B32B 37/02* | (2006.01) |
| *B32B 37/20* | (2006.01) |
| *D05C 17/02* | (2006.01) |
| *B32B 37/12* | (2006.01) |
| *B32B 38/18* | (2006.01) |
| *B32B 38/00* | (2006.01) |
| *D06N 7/00* | (2006.01) |

(52) U.S. Cl.
CPC .............. *B32B 37/20* (2013.01); *B32B 37/02* (2013.01); *B32B 37/1284* (2013.01); *B32B 38/004* (2013.01); *B32B 38/0012* (2013.01); *B32B 38/18* (2013.01); *D06N 7/0071* (2013.01); *D06N 7/0081* (2013.01); *B32B 2038/0076* (2013.01); *B32B 2305/18* (2013.01); *B32B 2305/28* (2013.01); *B32B 2327/06* (2013.01); *B32B 2375/00* (2013.01); *B32B 2471/02* (2013.01)

(58) Field of Classification Search
CPC ..... B32B 37/02; B32B 37/1284; B32B 37/20; B32B 38/004; B32B 2038/0076; B32B 2471/02; D06N 7/0071; D06N 7/0073; D06N 7/0076; D06N 7/0078; D06N 7/0081; D06N 2205/20; D04H 11/00; D05C 17/02
See application file for complete search history.

(56) References Cited

U.S. PATENT DOCUMENTS

| | | | | |
|---|---|---|---|---|
| 3,806,385 A | * | 4/1974 | Terry ................... | D06N 7/0071 156/324 |
| 5,198,277 A | * | 3/1993 | Hamilton .................. | B32B 5/26 156/72 |
| 5,545,276 A | * | 8/1996 | Higgins ................... | D06N 3/14 156/269 |
| 5,552,010 A | * | 9/1996 | Kajikawa ................ | B32B 37/02 156/231 |
| 5,560,972 A | * | 10/1996 | Blakely ..................... | B32B 5/26 428/92 |

(Continued)

*Primary Examiner* — Michael Tolin
(74) *Attorney, Agent, or Firm* — Quickpatents, LLC; Kevin Prince

(57) ABSTRACT

A carpet backing system for applying a coating to a roll of carpet includes elongated upper deck having a first end and a second end. An elongated lower deck is situated below and aligned with the upper deck. The upper deck includes a staging and unrolling station at a first end thereof, a pre-coat applicator for applying a pre-coat to the carpet, and an oven station to cure the pre-coat and allow the carpet to exit a second end of the upper deck. The lower deck includes a polymer applicator at a first end thereof for receiving the carpet and the pre-coat from the second end of the upper deck. The polymer applicator is adapted to apply the coating to the carpet. The lower deck further includes a heating platen conveyor, a plurality of cooling rolls, and optionally a carpet rolling station at a second end of the lower deck.

11 Claims, 5 Drawing Sheets

(56) References Cited

U.S. PATENT DOCUMENTS

| | | | | |
|---|---|---|---|---|
| 2004/0198120 A1* | 10/2004 | Scott | .......................... | B32B 5/24 |
| | | | | 442/221 |
| 2007/0275207 A1* | 11/2007 | Higgins | .................... | B32B 5/16 |
| | | | | 428/95 |
| 2009/0110869 A1* | 4/2009 | Streeton | ............... | D06N 7/0071 |
| | | | | 428/90 |

* cited by examiner

CARPET TILE COATING SYSTEM AND METHOD

CROSS-REFERENCE TO RELATED APPLICATIONS

This application claims the benefit of U.S. Provisional Patent Application 61/917,141, filed on Dec. 17, 2013, and incorporated herein by reference.

STATEMENT REGARDING FEDERALLY SPONSORED RESEARCH AND DEVELOPMENT

Not Applicable.

FIELD OF THE INVENTION

This invention relates to carpet manufacturing systems, and more particularly to an improved carpet tile coating system and method.

DISCUSSION OF RELATED ART

Traditional coating of a web of carpet with a polymer for eventual cutting of the carpet into carpet tiles, such as squares, has utilized multiple single-level assembly lines through which the carpet is unrolled, processed, rolled, transported to the next station, and so on. Such a traditional method of coating carpet results in multiple rolling and unrolling stations, a relatively high number of personnel, and the need for a relatively large amount of warehouse floor space. Further, additional handling of the pre-coated carpet to deliver it to the next coating process can result in inadvertent damage and injury.

Therefore, there is a need for a system that allows stacking and continuous flow of the carpet through all of the various coating processes required to coat such carpet. Such a needed invention would reduce the number of operators needed to coat such a carpet, as well as reduce the required floor space and improve quality. The present invention accomplishes these objectives.

SUMMARY OF THE INVENTION

The present device is a carpet backing system for applying a coating to a roll of carpet. Such a coating may comprise any of a pre-coat adhesive, a first polymer layer, a fiberglass sheet, and a bottom polymer layer. Such a layered carpet is suitable for cutting into geometric carpet tiles, or rolling for transport, storage or use elsewhere.

An elongated upper deck has a first end and a second end. An elongated lower deck is situated below and aligned with the upper deck. The lower deck has a first end below the second end of the upper deck, and a second end below the first end of the upper deck. Vertically stacking various carpet operation stations provides for a smaller footprint of the system on a warehouse floor and eliminates the need for rolling the carpet between stations.

The upper deck includes a staging and unrolling station at the first end thereof, adapted for receiving and unrolling the roll of carpet. The upper deck further includes a pre-coat applicator for applying a pre-coat to the carpet. The upper deck further includes an oven station to cure the pre-coat and allow the carpet to exit the second end of the upper deck.

The lower deck includes a polymer applicator at the first end thereof for receiving the carpet and the pre-coat from the second end of the upper deck. The polymer applicator is adapted to apply the coating to the carpet. The lower deck further includes a heating platen conveyor and a plurality of cooling rolls.

If the coated carpet is to be transported elsewhere, the second end of the lower deck may include a rolling station comprising an accumulator, a roll-up station, a wrapping station, and a staging table. Alternately, the second end of the lower deck may include a carpet cutting station for cutting the carpet continuously into geometric-shaped carpet tiles, such as squares.

The present invention is a system that allows stacking and continuous flow of the carpet through all of the various coating processes required to coat carpet for eventual cutting into carpet tiles. The present invention reduces the number of operators needed to coat such a carpet, as well as reduces the amount of warehouse floor space required for such an operation. Other features and advantages of the present invention will become apparent from the following more detailed description, taken in conjunction with the accompanying drawings, which illustrate, by way of example, the principles of the invention.

DESCRIPTION OF THE DRAWINGS

FIG. 6 is a partial diagram of a carpet and a coating of the invention.

DETAILED DESCRIPTION OF THE PREFERRED EMBODIMENT

Figure 1:
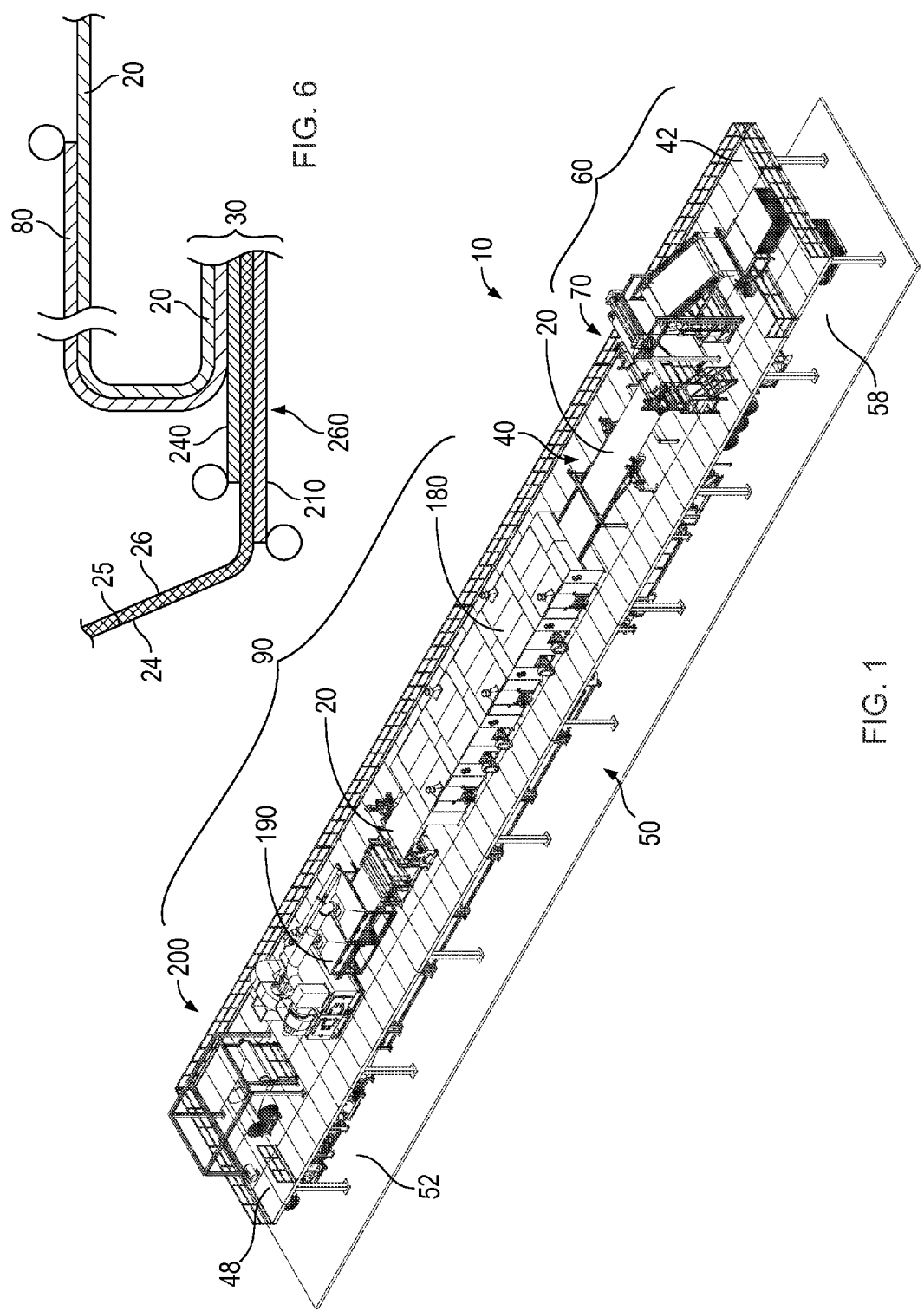
FIG. 1 is a perspective diagram of a preferred embodiment of the invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-5 illustrate a carpet backing system 10 for applying a coating 30 to a roll of carpet 20. Such a coating 30 may comprise any of a first polymer layer 105, a second polymer layer 230, a fiberglass sheet 25, or a pre-coat 80. Such a layered carpet 20 is suitable for cutting into geometric carpet tiles (not shown), or rolling for transport, storage or use elsewhere.

An elongated upper deck 40 has a first end 42 and a second end 48. An elongated lower deck 50 is situated below and aligned with the upper deck 40. The lower deck 50 has a first end 52 below the second end 48 of the upper deck 40, and a second end 58 below the first end 42 of the upper deck 40. Vertically stacking various carpet operation stations provides for a smaller footprint of the system 10 on a warehouse floor (not shown) and eliminates the need for rolling the carpet between stations.

The upper deck 40 includes a staging and unrolling station 60 at the first end 42 thereof, adapted for receiving and unrolling the roll of carpet 20. Preferably the staging and unrolling station 60 of the upper deck 40 includes a staging conveyor 130, an unroll cradle 140, a sewing table 150, a J-box accumulator 160, and a carpet guider 170 (FIG. 4), whereby a continuous web of the carpet 20 may be produced.

Figure 2:
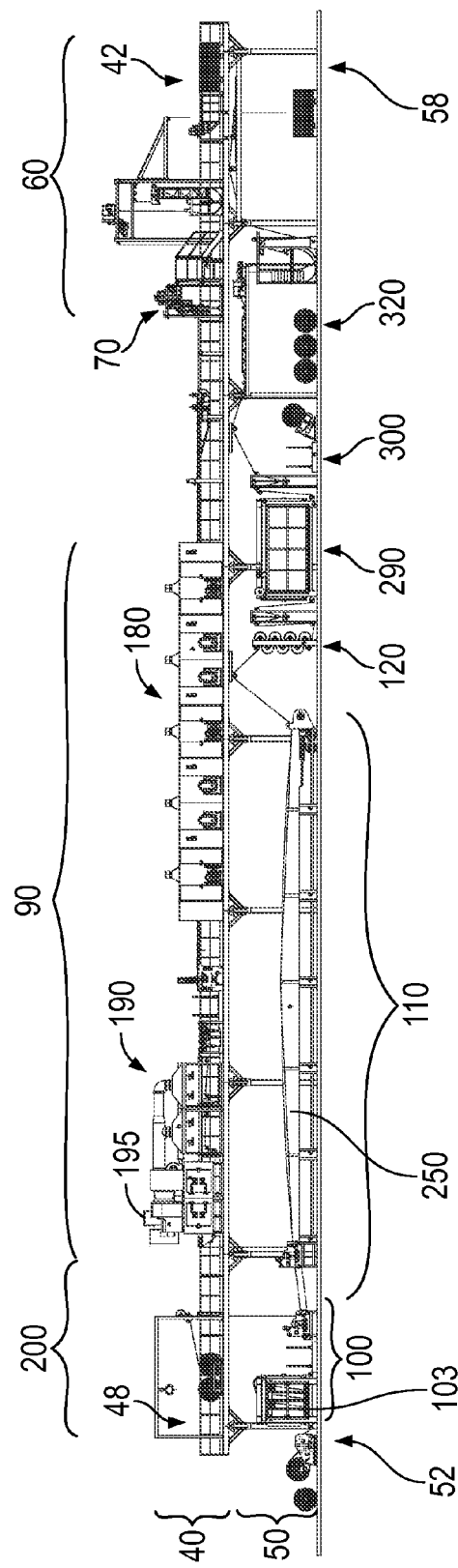
FIG. 2 is a side elevational diagram of FIG. 1.
Figure 3:
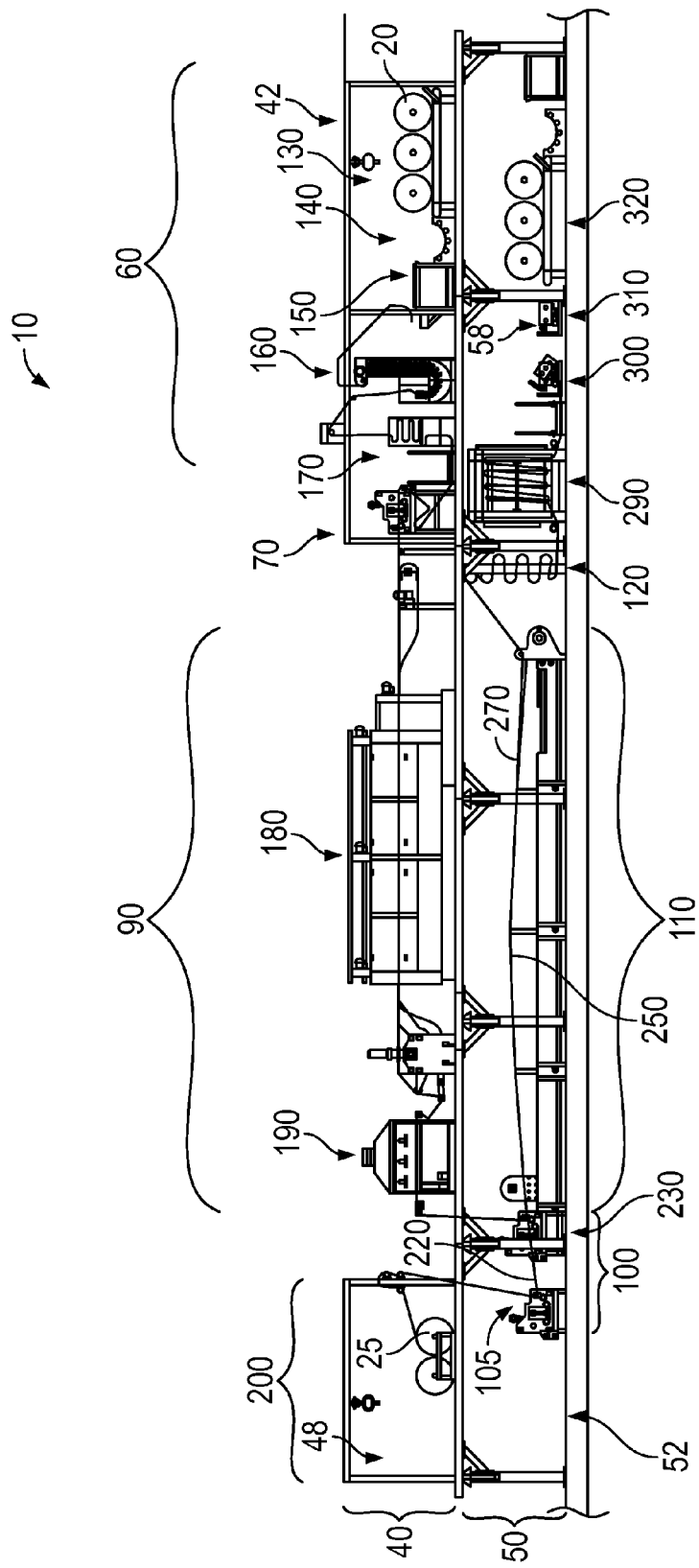
FIG. 3 is a side elevational diagram of an alternate embodiment of the invention.
Figure 4:
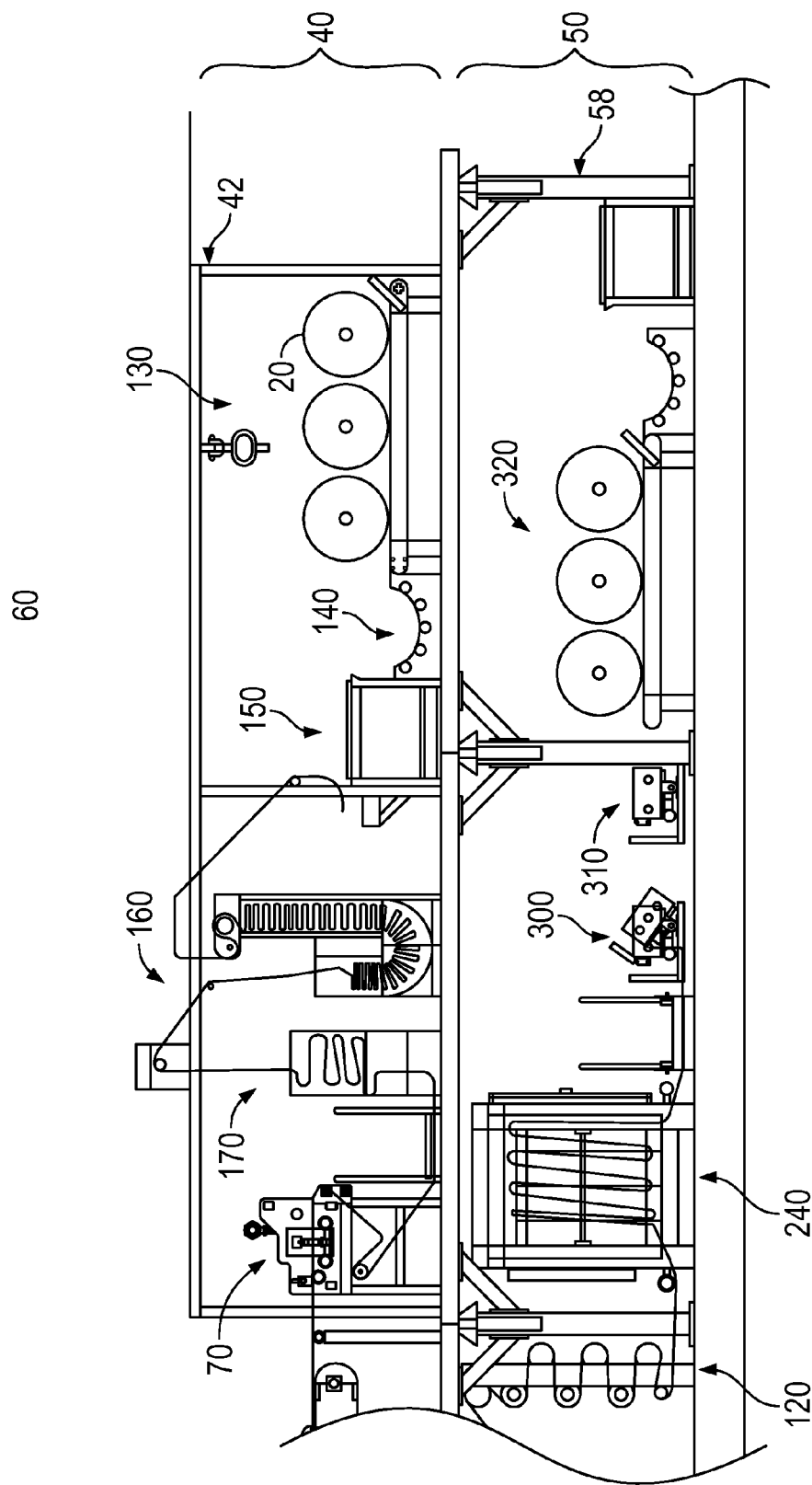
FIG. 4 is a partial, enlarged side elevational diagram of the first end of an upper deck and a second end of a lower deck of the embodiment of FIG. 3.

The upper deck 40 further includes a pre-coat applicator for applying a pre-coat 80 (FIG. 6) to the carpet 20. Such a pre-coat 80 is preferably a latex or PVC adhesive that locks a backstitch of the yarns of the carpet 20 into a primary backing cloth (not shown) to prevent the yarns from being pulled out when the carpet 20 is subject to foot traffic, chair wheels, or the like. The pre-coat 80 is preferably applied at a temperature suitable for the material used for the pre-coat 80. The upper deck 40 further includes an oven station 90 to cure the pre-coat 80 and allow the carpet 20 to exit the second end 48 of the upper deck 40. The oven station 90 preferably includes a convection oven 180 for drying or curing the adhesive pre-coat 80, and a relaxation oven 190 for re-heating the carpet 20 to remove any wrinkles or tensions that are often created during a previous application process, which can cause distortions in the carpet 20 caused by shrinking. Such an oven station 90 may include infrared-based ovens and further include a forced air convection box 195 for cooling (FIG. 2).

The lower deck 50 includes a polymer applicator 100 at the first end 52 thereof for receiving the carpet 20 and the pre-coat 80 from the second end 48 of the upper deck 40. In one embodiment, an additional continuous infeed system 103 may be provided (FIG. 2). The polymer applicator 100 is adapted to apply the coating 30 to the carpet 20. The lower deck 50 further includes a heating platen conveyor 110 and a plurality of cooling rolls 120, the temperature of the heating platen conveyor 110 and the speed through which the carpet 20 moves being dependent upon the nature and volume of the coating 30 that is applied by the polymer applicator 100.

Figure 5:
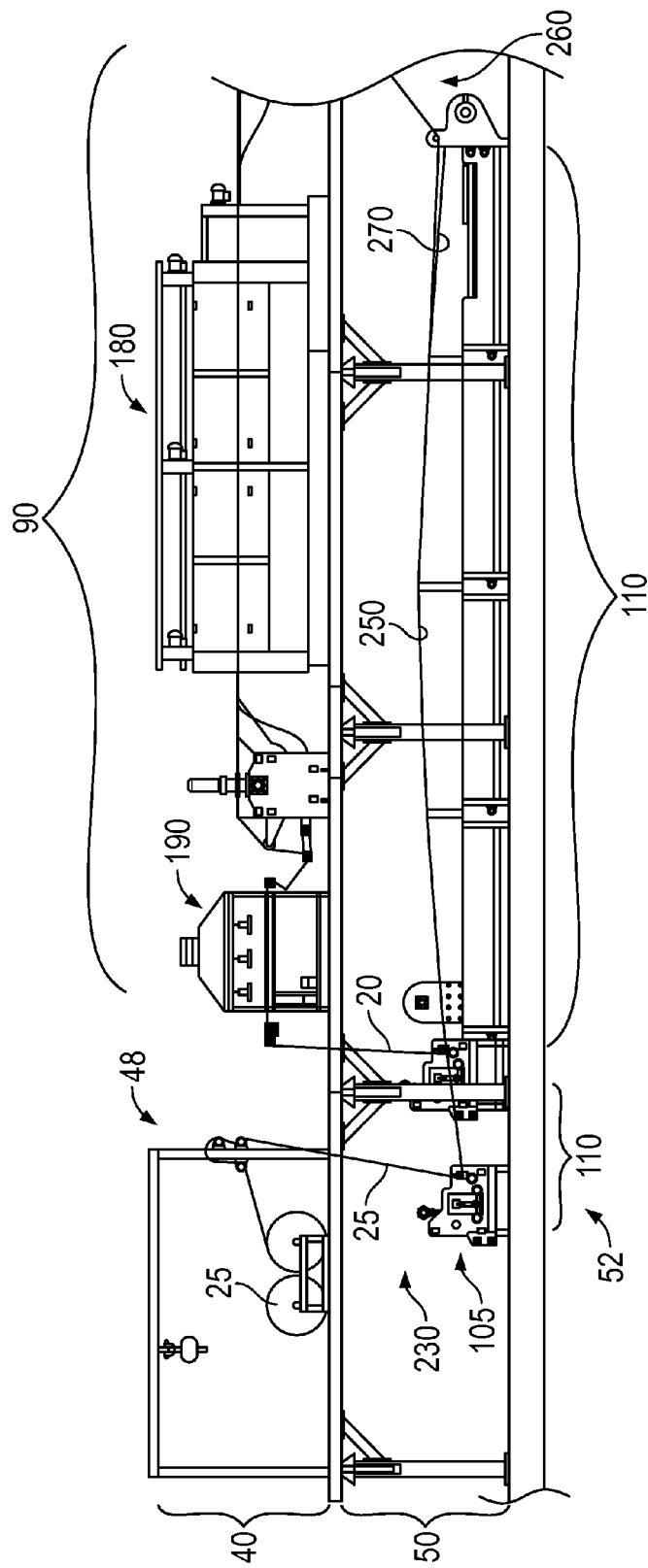
FIG. 5 is a partial, enlarged side elevational diagram of a second end of the upper deck and a first end of the lower deck of the embodiment of FIG. 3.

Preferably the second end 48 of the upper deck 40 further includes a fiberglass sheet staging and unrolling station 200 for unrolling a fiberglass sheet 25 (FIGS. 5 and 6). Further, the polymer applicator 100 at the first end 52 of the lower deck 50 in such an embodiment comprises both a first polymer applicator 105 for applying a liquid film first polymer layer 210 onto a moving belt 220. The continuous fiberglass sheet 25 is inserted into the first polymer applicator 105 to apply the first polymer layer 210 onto a bottom side 24 of the fiberglass sheet 25. The fiberglass sheet 25 and first polymer layer 210 then pass through a second polymer applicator 230 on the lower deck 50 that applies a second polymer 240 onto a top side 26 of the fiberglass sheet 25. The first and second polymer layers 210,240 are typically polyurethane or PVC-based compounds.

The fiberglass sheet 25 with the two layers of polymer 210,240 is then brought into contact with the carpet 20 from the upper deck 40. The combination of the carpet 20, fiberglass sheet 25, and polymer layers 210,240 then pass over a series of heated platens 250 of the heated platen conveyor 110 to cure, thereby creating a solid laminated substrate 260 which is separated from a supporting belt 270 just prior to passing over the plurality of cooling rolls 120.

If the coated carpet 20 is to be transported elsewhere, the second end 58 of the lower deck 50 may include a rolling station 280 comprising an accumulator 290, a roll-up station 30, a wrapping station 310, and a staging table 320. Alternately, the second end 58 of the lower deck 50 may include a carpet cutting station (not shown) for cutting the carpet continuously into geometric-shaped carpet tiles, such as squares (not shown).

Once the carpet backing system 10 has been provided in its different embodiments as listed above, methods of applying the coating 30 to the carpet 20 may comprise the following steps:

b) delivering the roll of carpet 20 to the staging and unrolling station 60 at the first end 42 of the upper deck 40 and moving the carpet in a first direction from the first end towards the second end of the upper deck.

c) unrolling the carpet 20 at the staging and unrolling station 60 to move the carpet 20 continuously through the subsequent steps.

d) applying the pre-coat 80 to the carpet 20 at the pre-coat applicator 70.

e) curing the pre-coat 80 to the carpet 20 at the oven 90.

f) moving the carpet 20 down to the polymer applicator 100 on the lower deck 50 to apply the polymer coating 30 to the carpet 20 at the polymer applicator 100 and moving the carpet along the lower deck in a direction opposite the first direction.

h) heating the polymer coating 30 and carpet 20 at the heating platen conveyor 110. and i) cooling the polymer coating 30 and the carpet 20 at the plurality of cooling rolls 120.

In one embodiment having the rolling station 280, the method may include the further step of:

j) rolling the polymer coating 30 and carpet 20 at the rolling station 280.

In one embodiment wherein the polymer applicator 100 includes a first and second polymer applicator 105, 230, the method may include the further step of:

g) unrolling a fiberglass sheet 25 at the fiberglass roll staging and unrolling station 200, applying a first polymer layer 105 and then a second polymer layer 240 to the fiberglass sheet 25 at the first and second polymer applicators 105,230, and bringing the fiberglass sheet 25, polymer layers 105,240, and the carpet 20 into mutual contact.

While a particular form of the invention has been illustrated and described, it will be scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A method of applying a coating to a roll of carpet, comprising the steps:
   a) providing an elongated upper deck having a first end and a second end; an elongated lower deck situated below and aligned with the upper deck, the lower deck having a first end below the second end of the upper deck and a second end below the first end of the upper deck; the upper deck including a staging and unrolling station at the first end thereof for receiving and unrolling the roll of carpet, a pre-coat applicator for applying a pre-coat to the carpet, and an oven station to cure the pre-coat and allow the carpet to exit the second end of the upper deck; the lower deck including a polymer applicator at the first end thereof for receiving the carpet from the second end of the upper deck and applying the coating to the carpet, a heating platen conveyor, and a plurality of cooling rolls;
   b) delivering the roll of carpet to the staging and unrolling station at the first end of the upper deck, and moving the carpet in a first direction from the first end towards the second end of the upper deck;
   c) unrolling the carpet at the staging and unrolling station to move the carpet in succession through the steps of:
   d) applying a pre-coat to the carpet at the pre-coat applicator;
   e) curing the pre-coat to the carpet at the oven;
   f) moving the carpet down to the polymer applicator on the lower deck to apply the polymer coating to the carpet at the polymer applicator, and moving the carpet along the lower deck in a direction opposite the first direction;
   h) heating the polymer coating and carpet at the heating platen conveyor; and
   i) cooling the polymer coating and carpet at the plurality of cooling rolls.

2. The method of claim 1 wherein step a) is a) providing an elongated upper deck having a first end and a second end; an elongated lower deck situated below and aligned with the upper deck, the lower deck having a first end below the second end of the upper deck and a second end below the first end of the upper deck; the upper deck including a staging and unrolling station at the first end thereof for receiving and unrolling the roll of carpet, a pre-coat applicator for applying a pre-coat to the carpet, an oven station to cure the pre-coat and allow the carpet to exit the second end of the upper deck; the lower deck including a polymer applicator at the first end thereof for receiving the carpet from the second end of the upper deck and applying the coating to the carpet, a heating platen conveyor, and a plurality of cooling rolls, and a rolling station for rolling the carpet up for its removal at the second end of the lower deck; and further including step j) rolling the polymer coating and carpet at the rolling station.

3. The method of claim 2 wherein the rolling station of the lower deck provided in step a) further includes an accumulator, a roll-up station, a wrapping station, and a staging table.

4. The method of claim 1 wherein the staging and unrolling station of the upper deck provided in step a) includes a staging conveyor, an unroll cradle, a sewing table, a J-box accumulator, and a carpet guider.

5. The method of claim 1 wherein the oven station provided in step a) includes a convection oven and a relaxation oven.

6. The method of claim 1 wherein the second end of the upper deck provided in step a) further includes a fiberglass roll staging and unrolling station, and wherein the polymer applicator at the first end of the lower deck provided in step a) includes a first polymer applicator for applying a liquid film first polymer layer onto a moving belt followed by insertion of a continuous fiberglass sheet flowing from the upper deck, the fiberglass sheet and first polymer layer passing through a second polymer applicator located on the lower deck that applies a second polymer layer on a top side of the fiberglass sheet, the fiberglass sheet with two layers of polymer then being brought into contact with the carpet from the upper deck, the combination of the carpet, fiberglass sheet, and polymer layers then passing over a series of heated platens of the heated platen conveyor to cure, thereby creating a solid laminated substrate which is separated from a supporting belt just prior to passing over the plurality of cooling rolls, and further including the step:
   g) unrolling a fiberglass sheet at the fiberglass roll staging and unrolling station, applying a first polymer layer and then a second polymer layer to the fiberglass sheet at the first and second polymer applicators, respectively, and bringing the fiberglass sheet, polymer layers and the carpet layer into mutual contact.

7. A carpet backing system for applying a coating to a roll of carpet, comprising:
- an elongated upper deck having a first end and a second end;
- an elongated lower deck situated below and aligned with the upper deck, the lower deck having a first end below the second end of the upper deck and a second end below the first end of the upper deck;
- the upper deck including a staging and unrolling station at the first end thereof for receiving and unrolling the roll of carpet, a pre-coat applicator for applying a pre-coat to the carpet, and an oven station to cure the pre-coat and allow the carpet to exit the second end of the upper deck;
- the lower deck including a polymer applicator at the first end thereof for receiving the carpet from the second end of the upper deck and applying the coating to the carpet, a heating platen conveyor, and a plurality of cooling rolls, wherein the system is configured to move the carpet in a first direction along the upper deck from the first end to the second end of the upper deck and to move in an opposite direction along the lower deck.

8. The carpet backing system of claim 7 wherein the staging and unrolling station of the upper deck includes a staging conveyor, an unroll cradle, a sewing table, a J-box accumulator, and a carpet guider.

9. The carpet backing system of claim 7 wherein the oven station includes a convection oven and a relaxation oven.

10. The carpet backing system of claim 7 wherein the second end of the upper deck further includes a fiberglass sheet staging and unrolling station, and wherein the polymer applicator at the first end of the lower deck includes a polymer applicator for applying a liquid film layer of polymer onto a moving belt followed by insertion of the continuous fiberglass sheet flowing from the upper deck, the fiberglass sheet and polymer layer passing through a second polymer applicator located on the lower deck that applies a second polymer on a top side of the fiberglass sheet, the fiberglass sheet with two layers of polymer then being brought into contact with the carpet from the upper deck, the combination of the carpet, fiberglass sheet, and polymer layers then passing over a series of heated platens of the heated platen conveyor to cure, thereby creating a solid laminated substrate which is separated from a supporting belt just prior to passing over the plurality of cooling rolls.

11. The carpet backing system of claim 7 further including a rolling station at the second end of the lower deck that includes an accumulator, a roll-up station, a wrapping station, and a staging table.

\* \* \* \* \*